(12) United States Patent
Oh

(10) Patent No.: US 12,252,130 B2
(45) Date of Patent: Mar. 18, 2025

(54) METHOD FOR CONTROLLING TRAVELING OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 17/954,170

(22) Filed: Sep. 27, 2022

(65) Prior Publication Data
US 2023/0137189 A1 May 4, 2023

(30) Foreign Application Priority Data

Oct. 28, 2021 (KR) ........................ 10-2021-0145114

(51) Int. Cl.
*B60W 10/18* (2012.01)
*B60W 10/04* (2006.01)
*B60W 30/18* (2012.01)
*B60W 30/045* (2012.01)

(52) U.S. Cl.
CPC ...... *B60W 30/18172* (2013.01); *B60W 10/04* (2013.01); *B60W 10/18* (2013.01); *B60W 30/045* (2013.01); *B60W 2510/18* (2013.01); *B60W 2520/10* (2013.01); *B60W 2520/18* (2013.01); *B60W 2540/18* (2013.01); *B60W 2552/40* (2020.02); *B60W 2710/18* (2013.01)

(58) Field of Classification Search
CPC ......... B60W 2520/10; B60W 2520/18; B60W 2540/18; B60W 30/045; B60W 30/18172; B60W 10/04; B60W 10/18; B60W 2552/40; B60W 2510/18
See application file for complete search history.

(56) References Cited

U.S. PATENT DOCUMENTS

| | | | |
|---|---|---|---|
| 9,199,639 B2 * | 12/2015 | Yamakado | B60W 10/08 |
| 11,685,367 B2 * | 6/2023 | Sallee | B60W 30/045 |
| | | | 701/82 |
| 2012/0046831 A1 * | 2/2012 | Hidaka | B60W 30/045 |
| | | | 701/38 |
| 2017/0137023 A1 * | 5/2017 | Anderson | B60W 10/20 |

* cited by examiner

*Primary Examiner* — Gonzalo Laguarda
(74) *Attorney, Agent, or Firm* — Morgan, Lewis & Bockius LLP

(57) ABSTRACT

A method for controlling the traveling of a vehicle includes determining, by a control unit, a basic torque command based on vehicle operating information collected during traveling of a vehicle; obtaining, by the control unit, vertical load information of a left wheel and a right wheel of the vehicle in real time during traveling of the vehicle based on information collected in the vehicle; determining, by the control unit, a partial braking amount from the determined real-time basic torque command and the obtained real-time vertical load information; and performing, by the control unit, a partial braking control controlled by an inner wheel braking device so that a braking force corresponding to the partial braking amount is applied to a turning inner wheel among the left wheel and the right wheel.

19 Claims, 7 Drawing Sheets

METHOD FOR CONTROLLING TRAVELING OF VEHICLE

CROSS-REFERENCE TO RELATED APPLICATION

The present application claims priority to Korean Patent Application No. 10-2021-0145114 filed on Oct. 28, 2021, the entire contents of which is incorporated herein for all purposes by this reference.

BACKGROUND OF THE PRESENT DISCLOSURE

Field of the Present Disclosure

The present disclosure relates to a method for controlling the traveling of a vehicle, and more specifically, to a method for controlling a braking force and a driving force by reflecting roll motion information in real time in advance while a vehicle is turning, thereby solving a problem in that a wheel slip is repeatedly caused by a roll motion and wheel slip control performance is reduced.

Description of Related Art

In spite of the recent introduction of various electronic control devices into a vehicle, the behavior of the vehicle is ultimately limited due to the limit of a frictional force on a road surface. This is because the behavior of the vehicle is obtained by the frictional force with the road surface through a tire. Therefore, how effectively the friction force can be used is an important factor that determines the behavior of the vehicle.

To effectively use the frictional force, it is important to control the driving force of the wheels not to exceed the frictional force that the road surface can provide. Here, the frictional force that the road surface can provide is complexly affected by the characteristics of the road surface, the longitudinal/lateral tire slip amount, the tire vertical load, etc., and among them, a factor that most directly determines the road friction force may be the tire vertical load.

In general, as a method for using the frictional force to limit the tire slip, an electronic control device such as an anti-lock braking system (ABS) and a traction control system (TCS) is used. However, the control methods of the ABS and the TCS have disadvantages in that they do not effectively exert slip control performance due to a problem such as a control cycle delay or a wheel speed signal processing to prevent malfunction.

According to the recent trend of a wheel slip control strategy of a motor-driven vehicle driven by a motor, there is the trend that many methods for using the torque and speed of the motor based on the fast behavior characteristics of the motor rather than using an actual vehicle speed (vehicle body reference speed) and the wheel speed are being presented.

This strategy has the advantage that it does not require the absolute or reference speed of the vehicle and therefore, may be effective in the e-4WD (4WD: Four Wheel Drive) system. However, when a control that reflects a roll motion in the vehicle that varies in real time and tire vertical load information changed thereby in advance is not performed, there may be the limit in which a situation requiring a control of reducing the driving force repeatedly occurs due to the limit of a feedback control.

For example, when a front-wheel driving force is generated during a turning traveling of the vehicle, a roll occurs and a lateral load movement occurs. That is, due to the turning behavior of the vehicle, a roll occurs due to a difference in the degree of contraction or tension between a left wheel suspension and a right wheel suspension, and at the same time, the lateral load movement occurs in the vehicle.

Accordingly, a partial slip of a tire occurs at the left and right wheels of the vehicle, and at the instant time, when a TCS operates to reduce the front wheel driving force, the slip and the roll may be reduced, securing the vertical load on the inner wheel tires again. However, if the front wheel driving force is increased again, the roll and the lateral load movement can occur again, causing the partial slip again.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling a braking force and a driving force by reflecting roll motion information in real time in advance while a vehicle is turning, solving a problem in that a slip is repeatedly caused by a roll motion and wheel slip control performance is reduced.

The object of the present disclosure is not limited to the aforementioned object, and other objects not mentioned may be clearly understood to those skilled in the art to which the present disclosure pertains (hereinafter referred to as 'those skilled in the art') from the following description.

To achieve the object, an exemplary embodiment of the present disclosure provides a method for controlling the traveling of a vehicle including determining, by a control unit, a basic torque command based on vehicle operating information collected during traveling of a vehicle; obtaining, by the control unit, vertical load information of a left wheel and a right wheel of the vehicle in real time during traveling of the vehicle based on information collected in the vehicle; determining, by the control unit, a partial braking amount from the determined real-time basic torque command and the obtained real-time vertical load information; and performing, by the control unit, a partial braking control controlled by an inner wheel braking device so that a braking force corresponding to the partial braking amount is applied to a turning inner wheel among the left wheel and the right wheel.

Therefore, according to the method for controlling the traveling of the vehicle according to an exemplary embodiment of the present disclosure, it is possible to perform the partial braking control in consideration of the change in the real-time lateral vertical load before the wheel slip occurs, preventing the excessive wheel slip phenomenon and stably securing the lateral traction of the tire. Furthermore, it is possible to control the driving force in consideration of the change in the real-time vertical load and the roll dynamics, preventing the repeated ON/OFF of the TCS through the present method for controlling the driving force and obtaining the roll damping effect.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
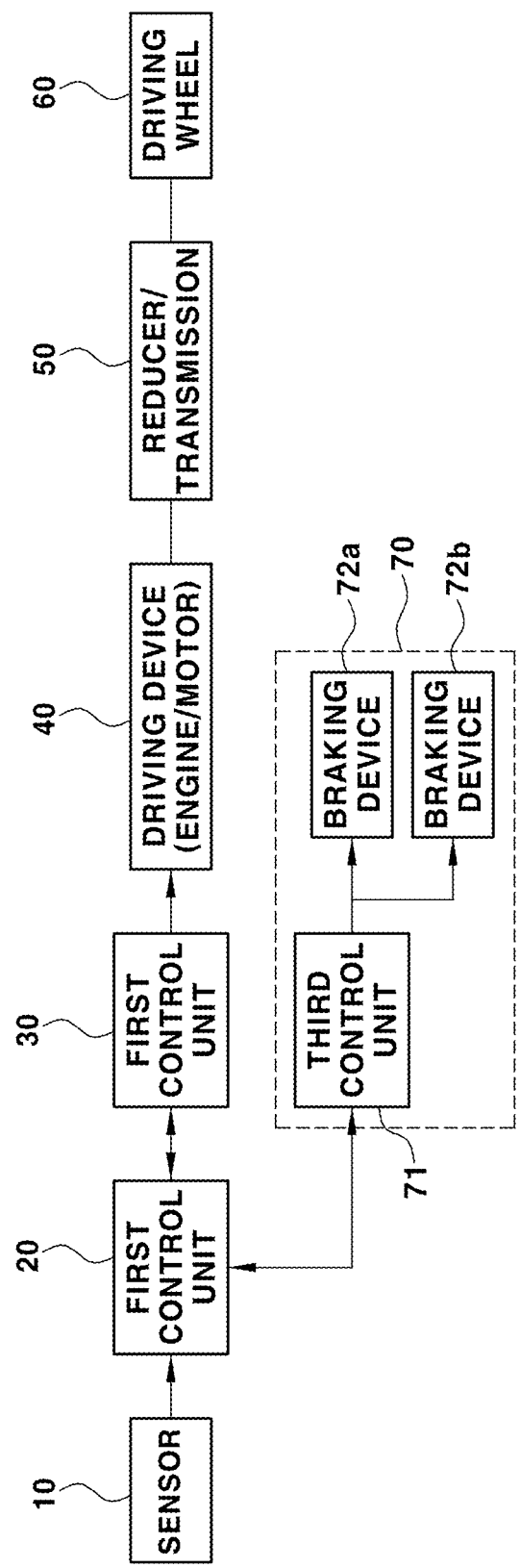
FIG. 1 is a block diagram showing a configuration of a system for performing a traveling control according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in exemplary embodiments of the present disclosure are only exemplified for describing the exemplary embodiments according to the concept of the present disclosure, and the exemplary embodiments according to the concept of the present disclosure may be carried out in various forms. Furthermore, the exemplary embodiments should not be interpreted as being limited to the exemplary embodiments described in the exemplary embodiment, and should be understood as including all modifications, equivalents, and substitutes included in the spirit and technical scope of the present disclosure.

Meanwhile, in the present disclosure, terms such as first and/or second may be used to describe various components, but the components are not limited to the terms. The terms are used only for distinguishing one component from other components, but for example, a first component may be referred to as a second component, and similarly, the second component can also be referred to as the first component, without departing from the scope according to the concept of the present disclosure.

When a component is referred to as being "connected" or "coupled" to another component, it should be understood that the components may be directly connected or coupled to each other, but yet another component can also exist therebetween. On the other hand, when a component is referred to as being "directly connected to" or "in direct contact with" another component, it should be understood that another component does not exist therebetween. Other expressions for describing the relationship between components, that is, expressions such as "between" and "directly between" or "adjacent to" and "directly adjacent to" should be also interpreted in the same manner.

Throughout the specification, the same reference numerals refer to the same elements. The terms used in the exemplary embodiment are for describing the exemplary embodiments and are not intended to limit the present disclosure. In the exemplary embodiment, the singular form also includes the plural form unless otherwise specified in the phrase. "Comprises" and/or "comprising" used in the specification specifies the presence of the mentioned component, step, operation, and/or element, and does not exclude the presence or the addition of one or more other components, steps, operations, and/or elements.

The present disclosure relates to a method for controlling the traveling of a vehicle, and an object of the present disclosure is to provide a method for controlling a braking force and a driving force by reflecting roll motion information in real time in advance while a vehicle is turning, solving a problem in that a slip is repeatedly caused by a roll motion and wheel slip control performance is reduced.

The present disclosure is characterized by performing a partial braking that applies a braking force to inner wheels upon turning using a tire vertical load, a roll angle, or tire vertical load information, and therefore, the present disclosure may be applied to a vehicle configured for a partial braking control. Here, the vehicle configured for the partial braking control may be a vehicle in which a left wheel braking device and a right wheel braking device of the vehicle may be independently controlled.

The braking device may be a frictional braking device provided on each vehicle wheel to generate and apply a frictional braking force to the vehicle wheel, and for example, a hydraulic braking device configured to generate and apply a braking force to the vehicle wheel using hydraulic pressure.

According to an exemplary embodiment of the present disclosure, a roll motion can exclude a roll due to left and right slopes of a road surface. In other words, in the following description, the roll may be the one considering only a suspension roll caused by a difference in the degree of contraction or tension between a left wheel suspension and a right wheel suspension, and a roll angle may be a suspension roll angle generated by the difference in the degree of contraction or tension between the left wheel suspension and the right wheel suspension.

For example, as a state where the suspension roll occurs, there are a state where the left wheel suspension is more rebounded (tensioned) than the right wheel suspension, a state where the right wheel suspension is more bumped (contracted) than the left wheel suspension, a state where the right wheel suspension is more rebound (tensioned) than the left wheel suspension, or a state where the left wheel suspension is more bumped (contracted) than the right wheel suspension due to the occurrence of a stroke difference between the left wheel suspension and the right wheel suspension.

Furthermore, the present disclosure includes a method for controlling a driving force in addition to the aforementioned partial braking control method, and performs a driving force correction control of controlling a driving device of the vehicle according to a torque command after correction by correcting a real-time basic torque command according to vehicle operating information upon partial braking.

The conventional control method for suppressing a wheel slip is a feedback control method for correcting the driving force after the wheel slip has already occurred. However, according to an exemplary embodiment of the present disclosure, the tire vertical load information before the wheel slip occurs is used, and the partial braking force is controlled to respond to a change in the tire vertical load in real time.

One of the most direct factors that determines the limit of the traction between the road surface and the tire is the tire vertical load. As the tire vertical load increases, the available traction increases, making it difficult to cause the wheel slip, and as the vertical tire load decreases, the available traction also decreases, making it vulnerable to the occurrence of the wheel slip.

There are many reasons for the change in the tire vertical load, and it is difficult to control the partial braking force in consideration of all reasons including disturbance. Therefore, the change in the vertical load caused by at least the roll behavior excluding the disturbance may be considered in the partial braking control.

During the turning of the vehicle, a roll moment occurs due to a difference between the center of gravity and the roll center in the vehicle, and the roll motion of the vehicle is excited. Therefore, the roll angle is generated by the mechanical characteristics of a suspension and a vehicle body. In general, the roll angle is generated in a direction opposite to a turning direction of the vehicle due to the suspension inertia of the vehicle, and the vehicle body is tilted, and at the instant time, when the roll motion occurs, the suspension of the vehicle is contracted and tensioned. Furthermore, the displacement of a spring or damper of the suspension occurs, affecting the tire vertical load.

The thus changed tire vertical load changes the limit of the traction in conjunction with the occurrence of the roll motion. Therefore, when the limit of the partial braking force is set in consideration of this in advance, it is possible to implement the partial braking measures in advance before the wheel slip occurs. Additionally, considering the charac- teristics that a maximum lateral tire traction is inversely proportional to a tire longitudinal slip amount, it is also possible to secure lateral stability due to an effect of preventing the wheel slip. Furthermore, it is possible to suppress the amount of change in the roll angle caused by the start and end of a TCS control due to an effect of preventing the wheel slip, obtaining an effect of the roll damping.

In the following description, an inner wheel of the vehicle is one of the left and right wheels, and an outer wheel is the other one of the left and right wheels, where the inner and outer are defined regardless of the turning direction of the vehicle as follows: considering the lateral load movement in the vehicle, the side including a larger vertical load (normal force) or an increasing vertical load of the left and right sides is defined as the outer, and the side having the smallest vertical load or a decreasing vertical load of the left and right sides is defined as the inner.

Hereinafter, an exemplary embodiment of the present disclosure will be described in detail with reference to the drawings.

Figure 2:
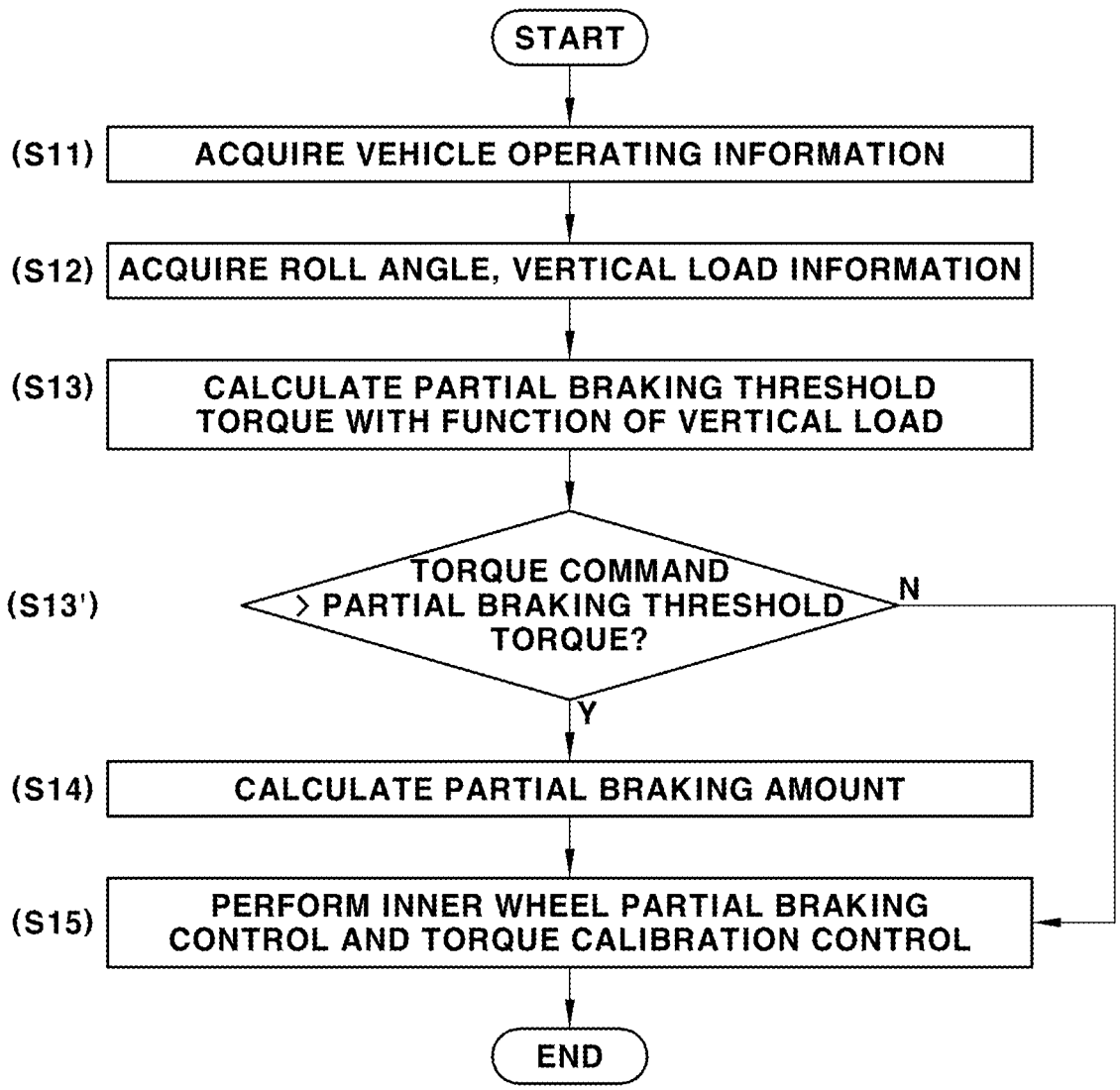
FIG. 2 and FIG. 3 are flowcharts showing a traveling control process according to an exemplary embodiment of the present disclosure.
Figure 3:
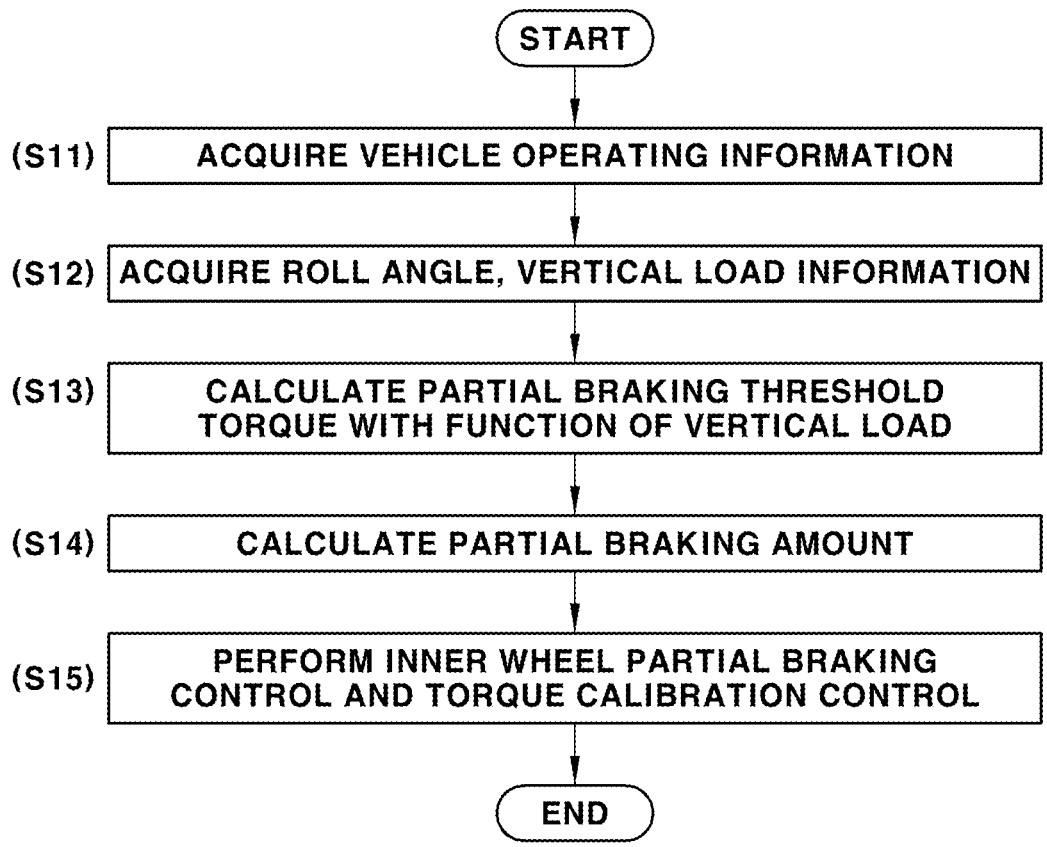

FIG. 1 is a block diagram showing a configuration of a system for performing a traveling control according to an exemplary embodiment of the present disclosure, and shows a configuration of performing a driving force control of the vehicle and a configuration of performing a partial braking control. FIG. 2 and FIG. 3 are flowcharts showing a traveling control process according to an exemplary embodiment of the present disclosure.

A device configured for performing a driving force control includes a first control unit 20 configured to determine a basic torque command from vehicle operating information, a second control unit 30 configured to control an operation of a driving device 40 according to a final torque command received in the first control unit 20, and the driving device 40 whose operation (generating a torque) is controlled by the second control unit 30 as a driving source for driving the vehicle.

The first control unit 20 determines a real-time basic torque command from the vehicle operating information, and then outputs the final torque command obtained by correcting the basic torque command to the second control unit 30. Therefore, the second control unit 30 controls the operation of the driving device 40 according to the final torque command output from the first control unit 20. The torque and rotation force output by the driving device 40 are delivered to a driving wheel 60 through a reducer or a transmission 50.

The basic torque command is determined and generated based on the real-time vehicle operating information collected by an operating information detection unit while traveling in the vehicle, and a method for determining the final torque command by correcting the basic torque command will be described later. The operating information detection unit can include a sensor 10, and the vehicle operating information can be sensor detection information detected by the sensor 10 and input to the first control unit 20 through a vehicle network.

Here, the sensor 10 configured to detect the vehicle operating information can include an accelerator pedal sensor (APS) configured to detect an accelerator pedal input value of a driver, a brake pedal sensor (BPS) configured to detect a brake pedal input value of the driver, a sensor configured to detect a driving system speed, and a sensor configured to detect a vehicle speed.

The drive system speed may be a rotation speed of the driving device 40 or a rotation speed (wheel speed) of the driving wheel 60. Here, the driving device 40 may be an engine or a motor, and the rotation speed of the driving device may be a rotation speed of an engine (engine speed) or a rotation speed of a motor (motor speed). At the instant time, the sensor configured to detect the drive system speed may be a sensor configured to detect the engine speed or the motor speed, and among them, the sensor configured to detect the motor speed may be a resolver configured to detect a position of a rotor of the motor. Alternatively, the sensor configured to detect the drive system speed may be a wheel speed sensor configured to detect the rotation speed (wheel speed) of the driving wheels 60.

Furthermore, the sensor configured to detect the vehicle speed can also be the wheel speed sensor. Because obtaining vehicle speed information from a signal of the wheel speed sensor is a well-known technology in the art, a detailed description thereof will be omitted.

As the vehicle operating information for determining and generating the basic torque command, which is detected by the sensor 10, the accelerator pedal input value (APS value) of the driver, the brake pedal input value (BPS value) of the driver, the speed (rotation speed) of the driving device 40, the vehicle speed, etc. may be selectively used. Among the vehicle operating information, the accelerator pedal input value and the brake pedal input value may be referred to as driver input information, and the speed and vehicle speed of the driving device 40 detected by the sensor may be referred to as vehicle state information.

Alternatively, the vehicle operating information can also be information determined by the first control unit 20 itself, or information (e.g., required driving force information) input to the first control unit 20 from another control unit (e.g., ADAS control unit) in the vehicle through a vehicle network. Furthermore, the first control unit 20 may be a high-level control unit configured to generate the basic torque command based on the vehicle operating information in the general vehicle, for example, a vehicle control unit (VCU) or a hybrid control unit (HCU).

Furthermore, according to the exemplary embodiment of the present disclosure, the sensor 10 can further include a sensor configured to detect a steering angle according to the driver's operation of a steering wheel, and a sensor of the suspension configured to obtain suspension roll angle information.

Here, the sensor configured to detect the steering angle may be a general steering angle sensor. Furthermore, the sensor of the suspension configured to obtain the suspension roll angle information may include a left wheel suspension position sensor and a right wheel suspension position sensor. A known method may be used in a process of obtaining the suspension roll angle information from the information detected by the sensor of the suspension. For example, it is possible to determine the suspension roll angle information of the vehicle in real time by comparing the position between the left and right wheels based on the signal from the position sensor.

Furthermore, as described above, the suspension roll angle may be obtained by an estimation process determined based on information collected from the vehicle through the sensor, etc., and the estimation method is known to those skilled in the art and therefore, a detailed description thereof will be omitted.

The second control unit 30 is a control unit configured to receive a final torque command output from the first control unit 20 to control the operation of the driving device 40 according to the received final torque command, and in a case where the driving device 40 is a motor, may be a motor control unit (MCU) configured to drive the motor through an inverter according to a torque command control the driving of the motor.

Figure 4:
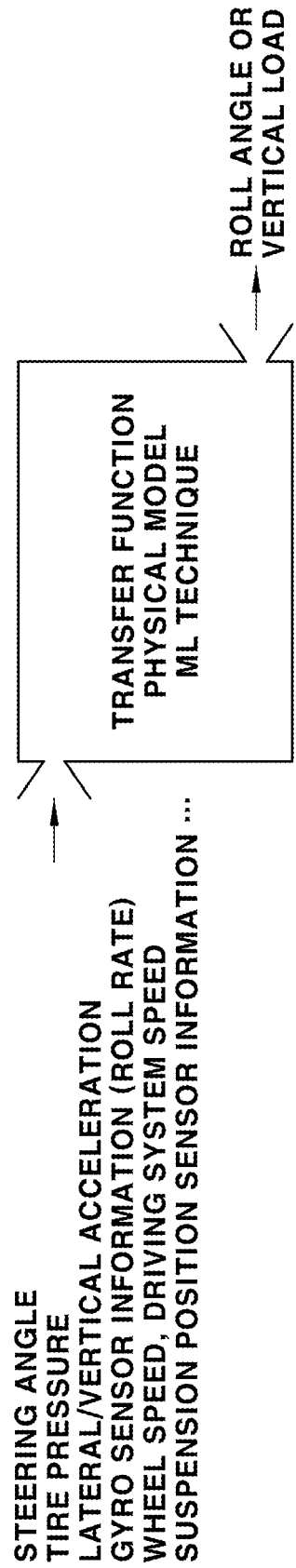
FIG. 4 is a diagram showing that a roll angle and a vertical load may be determined using a transfer function according to an exemplary embodiment of the present disclosure.

According to an exemplary embodiment of the present disclosure, the first control unit 20 performs a partial braking control during the turning traveling of the vehicle, and utilizes the suspension roll angle information and the tire vertical load information for the partial braking control. At the instant time, the suspension roll angle (hereinafter referred to as 'roll angle') and the tire vertical load (hereinafter referred to as ' vertical load') may be determined using a transfer function, and an example of determining them using the transfer function will be described as follows FIG. 4 is a diagram showing that the roll angle and the vertical load may be determined using the transfer function using the information collected in the vehicle as inputs. According to the exemplary embodiment of the present disclosure, the transfer function set in the first control unit 20 can take the following format.

First, a transfer function using the steering angle and the vehicle speed information as inputs and the roll angle information as outputs, and a transfer function using the roll angle information as the input and the vertical load information as the output may be used.

Alternatively, a transfer function using the steering angle and the vehicle speed information detected by the sensor as inputs and the vertical load information as the output, or a transfer function using tire pressure information detected by a tire pressure sensor as the input and the vertical load information as the output may be used.

Alternatively, a transfer function using information detected by a lateral acceleration sensor or a vertical acceleration sensor provided in the vehicle as the inputs and the roll angle or the vertical load information as the output may be used. Alternatively, a transfer function using the roll angle change rate (roll rate) information obtained by a gyro sensor (roll rate sensor) as the input and the roll angle or the vertical load information as the output can also be used.

Alternatively, a transfer function using information of the wheel speed sensor or other drive system speed sensors as the input and the roll angle or the vertical load information as the output can also be used. Here, the drive system speed may be a driving device speed (engine speed or motor speed) or a driveshaft speed.

Alternatively, a transfer function using information detected by the suspension position sensor as the input and the roll angle or the vertical load information as the output may be used. Alternatively, a transfer function using two or more of the aforementioned input information as the input and the roll angle or the vertical load information as the output may be used.

Here, the transfer function may be set to determine the roll angle or the vertical load using a data-based optimization technique, a numerical solution, etc. Alternatively, a transfer function based on a physical model can also be established and used, and a learning technique can also be used to obtain the transfer function. Alternatively, an algorithm having the above inputs and outputs can also be established using various machine learning (ML) techniques in addition to the transfer function FIG. 2 shows a process of controlling the partial braking and controlling the driving force according to the exemplary embodiment of the present disclosure, and when the vehicle operating information is obtained from the first control unit 20 (step S11), as described above, the basic torque command is determined based on the obtained vehicle operating information.

Furthermore, when there is a driver's steering input, a steering angle which is a steering input value is detected by the sensor 10, and then the traveling control process upon turning according to an exemplary embodiment of the present disclosure is performed. In the traveling control process upon turning, at the same time as the partial braking control of applying the braking force to the inner wheel, a driving force correction control of generating the driving force according to the final torque command (which is a torque command after correction to be described later) correcting the basic torque command is performed.

Upon the partial braking control, as described above, the vertical load information and the roll angle information are obtained in the first control unit 20 (step S12). Furthermore, after obtaining the roll angle and the vertical load information, the first control unit 20 performs the partial braking control so that the partial braking is carried out by a partial braking unit 70 based on the real-time vertical load information, or the real-time vertical load information and the roll angle information.

The partial braking unit 70 may include a third control unit 71 and braking devices 72a, 72b whose operations are controlled by the third control unit 71. Here, the third control unit 71 may be a general brake control unit configured to perform the braking control in the vehicle.

Furthermore, the braking device includes a left wheel braking device 72a and a right wheel braking device 72b provided on the left wheel and the right wheel, respectively, and is configured for being independently controlled to perform the partial braking. Here, the left wheel braking device 72a and the right wheel braking device 72b may be hydraulic braking devices (friction braking devices).

According to an exemplary embodiment of the present disclosure, the first control unit 20 and the third control unit 70 perform the partial braking, which applies the braking forces generated by the braking devices 72a, 72b, for the vehicle wheels that become the inner wheels of the left and right wheels under the cooperative control thereof.

At the present time, the first control unit 20 determines a partial braking threshold torque (step S13), and determines whether the torque command (basic torque command) determined based on the vehicle operating information during traveling exceeds the partial braking threshold torque (step S13') to set the partial braking to be performed only under exceeding conditions. Here, as described later, the partial braking threshold torque may be determined by a predetermined equation from the real-time vertical load information, or determined by a predetermined equation from the real-time vertical load information and roll angle information.

Furthermore, the first control unit is configured to determine the partial braking amount to carry out the partial braking (step S14), and at the instant time, the partial braking amount may be determined by a predetermined equation from the torque command (basic torque command) and the partial braking threshold torque. As described above, when the partial braking amount is determined, the first control unit 20 controls the braking devices 72a, 72b provided on the inner wheel in cooperative control with the third control unit 71, so that the braking force equal to the determined partial braking amount may be applied to the inner wheel by the braking devices 72a, 72b (step S15).

Alternatively, as shown in FIG. 3, the first control unit 20 can obtain the vertical load information and the roll angle information without determining the conditions exceeding the partial braking threshold torque as described above (step S13), then determine the partial braking amount directly from the real-time vertical load information and the roll angle information (step S14), and carry out the partial braking that allows the braking force equal to the determined partial braking amount to be generated in the inner wheel by the control devices 72a, 72b in cooperative control with the third control unit 71 (step S15).

In the above description, while the control subject has been described by being divided into the first control unit, the second control unit, and the third control unit, the control process according to an exemplary embodiment of the present disclosure can also be performed by one integrated control element instead of a plurality of control units. One control element integrated with a plurality of control units may be collectively referred to as a control unit, and the control process according to an exemplary embodiment of the present disclosure to be described below may be performed by the control unit. In other words, the control unit can collectively refer to all of the first control unit, the second control unit, and the third control unit.

In general, an operation of the driving device (engine or motor) is controlled according to the torque command during the traveling of the vehicle, and at the instant time, the output torque of the driving device accelerates the vehicle. Furthermore, when the steering wheel is operated by the driver while the vehicle is traveling at an arbitrary speed by the torque of the driving device, the vehicle performs the turning motion.

At the present time, the vehicle is turned according to the driver's steering input value, that is, the steering angle. Upon turning, the roll angle is generated by lateral dynamics, and at the same time, the vertical loads on the left and right wheels are changed. This may be understood as a lateral load movement, and in general, the vertical load (normal force) applied to the inner wheel upon turning decreases compared to when going straight, and the vertical load applied to the outer wheel increases compared to when going straight.

The vertical loads on the left and right wheels upon turning does not simply decrease or increase, but a change pattern may be diversified by the mechanical characteristics of the suspension, roll stabilizer, and vehicle body of the vehicle. Furthermore, according to the change in the vertical load in the present transient state, the wheel speed of the driving wheel can cause the phenomenon in which the slip is momentarily generated and then converged, and the slip is generated again.

Due to the present phenomenon, the wheel slip control cannot be performed smoothly, and a significant amount of wheel slip can occur, and the wheel slip can seriously lose the lateral traction and cause instability by the general tire characteristics in which the lateral traction is inversely proportional to the longitudinal wheel slip amount. These characteristics may be understood as a limitation that a corresponding feedback control method inevitably has after the wheel slip occurs.

Figure 5:
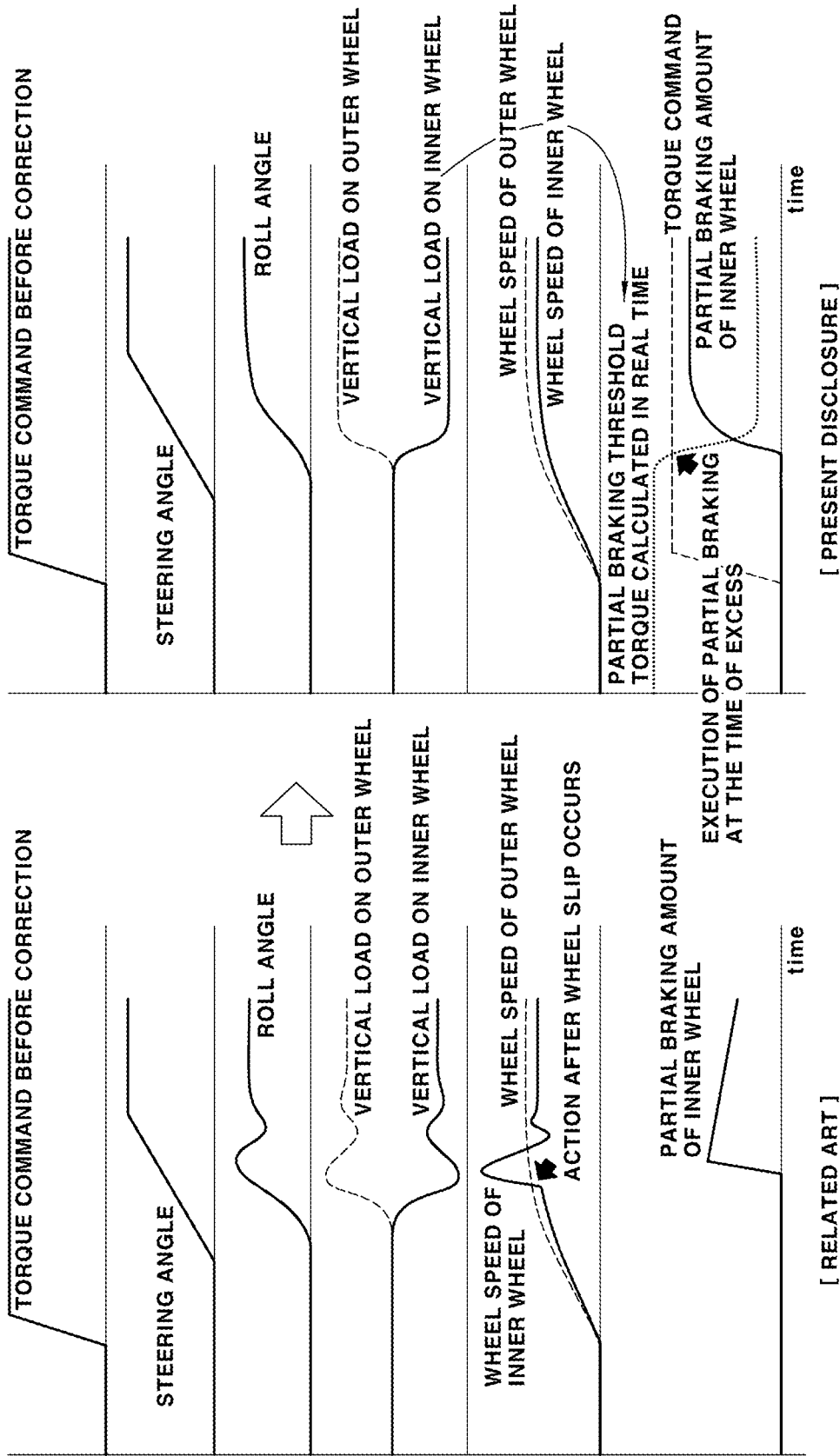
FIG. 5 is a diagram showing a comparison between a conventional wheel slip control state and a control state according to an exemplary embodiment of the present disclosure.

On the other hand, according to the present disclosure, the tire vertical load information on the left and right wheels may be known through a transfer function, a model, or a learning or machine learning technique, and it is possible to prevent the occurrence of the wheel slip in advance by controlling the partial braking force in real time based on above. Therefore, the intervention of the conventional wheel slip control is unnecessary. Furthermore, because the vertical load interlocking with the roll behavior and the partial braking threshold torque value proportional thereto may be known in real time, this can allow a state where a braking torque (partial braking torque) actually applied through the braking device of the inner wheel while the partial braking is applied is always lower than the partial braking threshold torque to be maintained (see FIG. 5).

Hereinafter, a method for controlling the partial braking and controlling the driving force performed by the control unit will be described in more detail.

First, the control unit may be set to perform the partial braking control only when a predetermined condition for starting the partial braking is satisfied, and at the instant time, the condition for starting the partial braking may be set as a condition in which the real-time basic torque command exceeds the partial braking threshold torque (see step S13' in FIG. 2).

Here, the partial braking threshold torque may be determined from the vertical load (normal force) information determined by the transfer function in the control unit. Since the partial braking threshold torque is basically set to prevent the slip of the inner wheel, the partial braking threshold torque is determined using the smaller value of the vertical load on the left wheel and the vertical load on the right wheel.

However, in general, if the vehicle is turning to a steady state, it may be understood that since the vertical loads on the turning inner wheels close to the turning center are smaller than the vertical loads on the outer wheels, the partial braking threshold torque is determined based on the vertical loads on the inner wheels.

Equation 1 below shows an example of an equation for determining the partial braking threshold torque using the vertical load information.

$$\text{Partial braking threshold torque} = \sigma_0 \times \sigma_1 \times \min(\text{vertical load } on \text{ the left wheel, vertical load } on \text{ the right wheel}) \quad \text{Equation 1}$$

As shown in Equation 1, the partial braking threshold torque value is determined using the smaller value (minimum value) of the vertical load on the left wheel and the vertical load on the right wheel. Here, the vertical load on the left wheel and the vertical load on the right wheel may be a value obtained by summing the vertical load on a front wheel and the vertical load on a rear wheel of each of the left and right sides, or the vertical loads of all driving wheels of each of the left and right sides. For example, the vertical load on the left wheel may be the sum of the vertical load on the left wheel among the front wheels and the vertical load on the left wheel among the rear wheels.

Furthermore, in Equation 1, $\sigma_0$ refers to a preset coefficient for converting the vertical load information into the partial braking threshold torque value, that is, for correcting and matching units between the vertical load (unit: N) and the torque (unit: N·m). Furthermore, $\sigma_1$ refers to a parameter which is linked with information on the maximum friction coefficient of the road surface on the road on which the vehicle is traveling. The $\sigma_1$ cannot be used when there is no information on the maximum friction coefficient of the road surface in the vehicle in determining the partial braking threshold torque.

However, when there is the information on the maximum friction coefficient of the road surface, the control unit can use $\sigma_1$ as in Equation 1 so that the partial braking threshold torque value is adjusted according to the maximum friction coefficient of the road surface. In other words, the control unit can determine a rate (%) of securing the maximum friction coefficient compared to a high friction road surface with respect to the traveling road surface, and determine the partial braking threshold torque value as in Equation 1 using the determined rate (%) of securing the maximum friction coefficient as $\sigma_1$.

Here, when explaining the rate (%) of securing the maximum friction coefficient compared to the high friction road surface, in general, the high friction road surface may be a dry asphalt, and the maximum friction coefficient of the dry asphalt which is the high friction road surface is about 0.9 to 1. Therefore, the maximum friction coefficient of the high friction road surface may be used by being set as 1 which is the maximum friction coefficient of the dry asphalt.

Furthermore, a slippery road surface such as a sandy or wet road surface or a snowy road is a low friction road surface, and the maximum friction coefficient of this low friction road surface is smaller than that of the high friction road surface. For example, if the maximum friction coefficient of the road surface on which the vehicle travels is 0.3, the rate of securing the maximum friction coefficient of the traveling road surface compared to the high friction road surface whose maximum friction coefficient is 1 is 30%. As described above, the rate of securing the maximum friction coefficient compared to the high friction road surface of the road surface on which the vehicle travels may be defined as a percentage value of the maximum friction coefficient of the traveling road surface with respect to the preset maximum friction coefficient of the high friction road surface.

Furthermore, as described above, the partial braking threshold torque value may be determined by multiplying the rate of securing the maximum friction coefficient of the traveling road surface, and if the rate of securing the maximum friction coefficient of the traveling road surface is 30% ($\sigma_1 = 0.3$), the partial braking threshold torque value may be determined by multiplying 0.3 (=30%).

Figure 6:
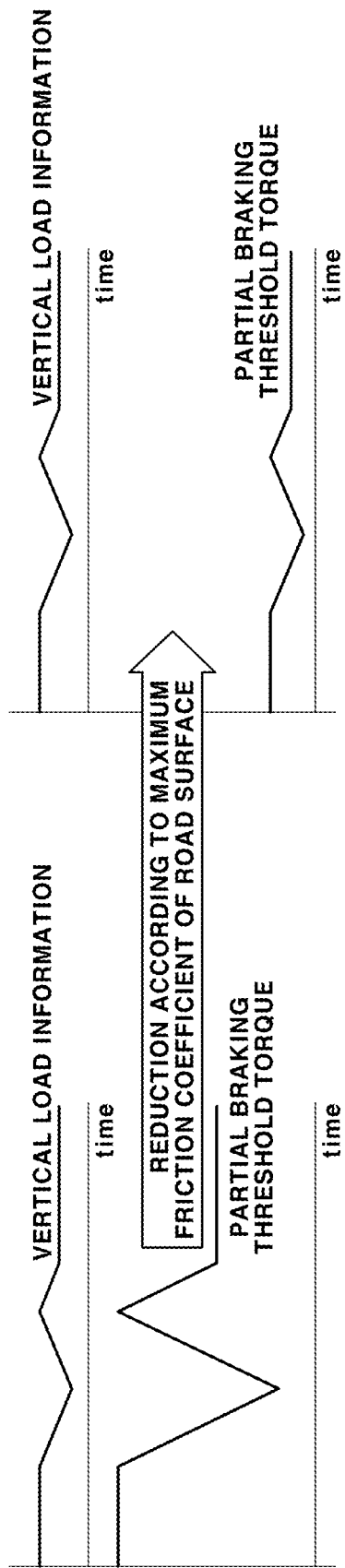
FIG. 6 is a diagram showing an example in which a partial braking threshold torque value is adjusted according to a maximum friction coefficient of a road surface according to an exemplary embodiment of the present disclosure.

A method for determining and deciding the friction coefficient of the road surface on which the vehicle travels based on image information captured by a camera in the vehicle is known. As described above, according to an exemplary embodiment of the present disclosure, in Equation 1, the parameter $\sigma_1$ linked with the information on the maximum friction coefficient of the road surface is used, and therefore, even in the same vertical load condition as shown in FIG. 6, the partial braking threshold torque value actually used may be adjusted according to the maximum friction coefficient of the road surface.

For Equation 1, it is determined whether to start the partial braking by determining the partial braking threshold torque that reflects only the vertical load information of the inner wheel during turning. However, the partial braking threshold torque that reflects a roll angle ($\varphi$) which is real-time roll motion information of the vehicle, and a roll angle change rate (roll rate) (p) obtained from the roll angle may be additionally determined and used. Here, the roll angle change rate information may be obtained from the transfer function like the roll angle or the vertical load information, or can also be obtained by differentiating the roll angle. Equation 2 below is an equation configured for determining the partial braking threshold torque using the roll angle ($\varphi$), the roll angle change rate (p), and vertical load information at the same time.

$$\text{Partial braking threshold torque} = \sigma_0 \times \sigma_1 \times \min(\text{vertical load } on \text{ the left wheel, vertical load } on \text{ the right wheel}) - \sigma_2 \times |\varphi| - \sigma_3 \times \text{sign}(\varphi) \times p \quad \text{Equation 2}$$

Figure 7:
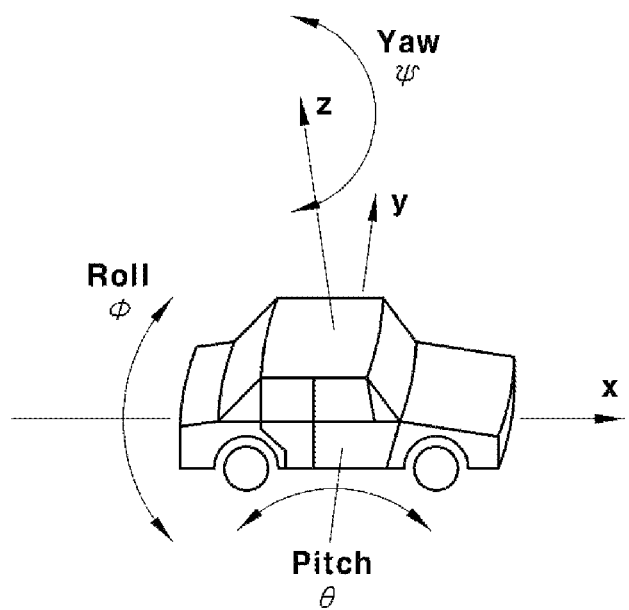
FIG. 7 is a diagram showing a vehicle coordinate frame and the roll angle.

In Equation 2, $\varphi$ refers to the roll angle, and p refers to the roll angle change rate. Here, the roll angle ($\varphi$) is defined as shown in FIG. 7. Furthermore, $\sigma_0$ and $\sigma_1$ are the same as in Equation 1, and $\sigma_2$ and $\sigma_3$ are coefficients that determine how much the roll angle ($\varphi$) and the roll angle change rate (p) are to be reflected to the partial braking threshold torque, respectively, and these values are preset in the control unit.

Furthermore, sign($\varphi$) is set as '+1' if $\varphi$ is a positive value, and as '−1' if $\varphi$ is a negative value. Furthermore, ‖ refers to an absolute value.

The reason for determining the partial braking threshold torque value by taking the absolute value of the roll angle in Equation 2 is to reflect an effect that the vertical load on one side is decreased as the vehicle tilts further from the center in either the left or right direction in the roll angle.

Furthermore, the reason of reflecting a value obtained by multiplying the roll angle change rate by sign($\varphi$), which is a value indicating the direction of the roll angle, to the determination of the partial braking threshold torque value is to decrease the partial braking threshold torque when there is a component of the roll angle change rate in a direction that tilts further away from the center, and to increase the partial braking threshold torque when there is the component of the roll angle change rate in a direction of recovery to the center.

Furthermore, according to another exemplary embodiment of the present disclosure, the partial braking threshold torque can also be determined as in Equation 3 below.

$$\text{Partial braking threshold torque} = \min\{(\sigma_0 \times \sigma_1 \times \text{the vertical load } on \text{ the left wheel} - \sigma_2 \times \varphi - \sigma_3 \times p), (\sigma_0 \times \sigma_1 \times \text{the vertical load } on \text{ the right wheel} + \sigma_2 \times \varphi + \sigma_3 \times p)\} \quad \text{Equation 3}$$

The behavior direction of the vehicle follows the ISO vehicle coordinate frame shown in FIG. 7. Furthermore, the definition of each sign in Equation 3 is the same as in Equation 2.

One of the roll angle and the roll angle change rate cannot be used in the determination of Equations 2 and 3. In other words, in Equations 2 and 3, terms of '$\sigma_2 \times |\varphi|$' and '$\sigma_2 \times \varphi$' may be deleted. Alternatively, terms of '$\sigma_3 \times \text{sign}(\varphi) \times p$' and '$\sigma_3 \times p$' in Equations 2 and 3 may be deleted.

After the partial braking threshold torque value is obtained as described above, the control unit is configured to perform the partial braking control when the torque command (basic torque command, the torque command before correction) determined from the vehicle operating information exceeds the partial braking threshold torque value (refer to step S13' in FIG. 2), and the braking force is applied to the inner wheels by the braking device.

At the present time, the control unit (the first control unit) determines the partial braking amount using the basic torque command the partial braking threshold torque value (step S14), and generates the braking torque command corresponding to the determined partial braking amount. Furthermore, the control unit (the third control unit) controls the operation of the braking device provided on the inner wheel according to the generated braking torque command, so that a braking force corresponding to the partial braking amount may be generated on the inner wheel.

According to an exemplary embodiment of the present disclosure, the partial braking amount may be determined as a value obtained by multiplying an excess of the basic torque command exceeding the partial braking threshold torque value by a partial braking ratio. Here, the value of the partial braking ratio may be a value preset in the control unit. When the vehicle to which the present disclosure is applied is a vehicle provided with an open differential that distributes the driving force of the driving device 40 to the left and right wheels in a rate of 50:50 as a differential device, the value of the partial braking ratio is set as 0.5 (=½).

Equation 4 below is an equation for determining the partial braking amount.

$$\text{Partial braking amount} = (\text{basic torque command} - \text{partial braking threshold torque}) \times \text{partial braking ratio} \quad \text{Equation 4}$$

In Equation 4, the basic torque command is a torque command (torque command before correction) determined based on the vehicle operating information by the first control unit 20, and the partial braking ratio may be a preset value (e.g., 0.5).

Meanwhile, when the execution of the partial braking is determined, thereafter, while the partial braking is executed, the control unit can perform a torque correction control of correcting the basic torque command using the partial braking threshold torque value to compensate for the reduction in the driving force due to the partial braking, and controlling the operation of the driving device 40 to generate the driving force according to the torque command after correction (step S15). At the instant time, the torque command of the driving device 40 is increased so that the driving force considering the partial braking is equal to the driving force required by the driver to compensate for the reduction in driving force due to the partial braking.

Equation 5 below shows an equation for correcting the basic torque command using the partial braking threshold torque value, and the torque command after correction determined by Equation 5 becomes a final torque command generated by the first control unit 20 and then delivered to the second control unit 30.

$$\text{Torque command after correction} = (\text{basic torque command} - \text{partial braking threshold torque} \times \text{partial braking ratio})/(1 - \text{partial braking ratio}) \quad \text{Equation 5}$$

In Equation 5, the partial braking ratio is as described in Equation 4.

As described above, the method for preventing the wheel slip in advance by performing the partial braking only with the vertical load information and the roll behavior information without reducing the driving force in the in-vehicle system configured for the partial braking has been described.

However, what should be additionally considered is the maximum value of the vertical load on the left wheel and the vertical load on the right wheel upon turning, that is, the vertical load (normal force) of the outer wheel. According to the aforementioned method, because the partial braking threshold torque value is determined based only on the inner wheel, the outer wheel is not considered in a process of controlling the driving force.

However, if the driving force delivered to the outer wheel by the torque command exceeds the partial braking threshold torque value determined based on the outer wheel, the wheel slip cannot be prevented only by the partial braking. In the present situation, because the slip can occur even in the outer wheel with an increased vertical load, the limit to the driving force as well as the execution of the partial braking should be considered simultaneously.

Therefore, the torque command of the driving device 40 during the execution of the partial braking should be limited to an upper limit value, and a torque upper limit value for limiting the torque command may be determined by Equation 6 below.

$$\text{Torque upper limit value} = \sigma_0 \times \sigma_1 \times \max(\text{vertical load } on \text{ the left wheel}, \text{vertical load } on \text{ the right wheel}) + \sigma_2 \times |\varphi| + \sigma_3 \times \text{sign}(\varphi) \times p \quad \text{Equation 6}$$

In Equation 6, the definition of each sign is the same as in Equation 2.

Therefore, the control unit is configured to perform a torque limit control that limits the driving torque, which is actually generated and output by the driving device 40 during the execution of the partial braking while the vehicle is turning, not to exceed the torque upper limit value. In other words, if the torque command after correction is the same value as the torque upper limit value, the torque command after correction becomes the final torque command for the driving device 40, but if the torque command after correction is different from the torque upper limit value, the smaller of the two becomes the final torque command.

For example, when the torque command after correction exceeds the torque upper limit value, the torque command of the torque upper limit value becomes the final torque command, and the operation of the driving device 40 is controlled by the torque command of the torque upper limit value. If the torque command after correction does not exceed the torque upper limit value, the operation of the driving device 40 is controlled by the torque command after correction.

Furthermore, as another exemplary embodiment of the present disclosure, the control unit can directly determine the partial braking amount using the roll angle information and the vertical load information without determining the partial braking start condition as shown in FIG. 3 (step S14), and also perform the partial braking control of applying the braking force to the inner wheel according to the determined partial braking amount (step S15). Even in the instant case, the correction control for the driving force may be performed in the same manner (step S15).

At the present time, regardless of the partial braking start condition, the partial braking amount for executing the partial braking may be determined by Equation 7 below.

$$\text{Partial braking amount} = \sigma_4 \times \{\text{basic average vertical load} - \min(\text{vertical load } on \text{ the left wheel, vertical load } on \text{ the right wheel})\} + \sigma_5 \times |\varphi| + \sigma_6 \times \text{sign}(\varphi) \times p \quad \text{Equation 7}$$

In Equation 7, there are three components using $\sigma_4$, $\sigma_5$, and $\sigma_6$, but an equation having at least one of the three components may be used as an equation for determining the partial braking amount. In other words, in Equation 7, the partial braking amount may be determined using an equation having at least one of the three terms on the right side, and when all three terms are used, an equation of determining the partial braking amount becomes Equation 7.

In Equation 7, the basic average vertical load is the average vertical load of the left and right wheels based on a stopped state and a flat ground, and $\sigma_4$ is a preset coefficient for converting load information into the torque value, that is, for matching and converting the units. $\sigma_5$ and $\sigma_6$ are coefficients determining how much the roll angle ($\varphi$) and the roll angle change rate (p) are to be reflected to the partial braking amount, respectively, and these values are preset in the control unit.

As described above, the method for controlling the traveling of the vehicle according to an exemplary embodiment of the present disclosure has been described in detail. According to the aforementioned method for controlling the traveling according to an exemplary embodiment of the present disclosure, it is possible to perform the partial braking control in consideration of the change in the real-time lateral vertical load before the wheel slip occurs, preventing the excessive wheel slip phenomenon and stably securing the lateral traction of the tire. Furthermore, it is possible to control the driving force in consideration of the change in the real-time vertical load and the roll dynamics, preventing the repeated ON/OFF of the TCS through the present method for controlling the driving force and obtaining the roll damping effect. That is, it is possible to prevent roll overshoot (shaking). The effect of the present disclosure appears more greatly in a sports utility vehicle (SUV) where the distance between the center of gravity and the center of the roll is large.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling traveling of a vehicle, the method comprising:
   determining, by a control unit, a basic torque command based on vehicle operating information collected in real time during traveling of the vehicle;
   obtaining, by the control unit, vertical load information of a left wheel and a right wheel of the vehicle in real time during traveling of the vehicle based on information collected in the vehicle;
   determining, by the control unit, a partial braking amount based on the determined real-time basic torque command and the obtained real-time vertical load information;
   performing, by the control unit, a partial braking control controlled by an inner wheel braking device so that a braking force corresponding to the partial braking amount is applied to a turning inner wheel among the left wheel and the right wheel; and
   determining, by the control unit, a partial braking threshold torque value based on the obtained real-time vertical load information; and
   comparing, by the control unit, the determined real-time basic torque command with the determined partial braking threshold torque value,
   wherein when the basic torque command exceeds the partial braking threshold torque value, the determining of the partial braking amount and the performing of the partial braking control are performed by the control unit.

2. The method of claim 1,
wherein in the determining of the partial braking amount, the control unit is configured to determine the partial braking amount based on the determined real-time basic torque command and the determined partial braking threshold torque value.

3. The method of claim 1,
wherein in the determining of the partial braking threshold torque value, the partial braking threshold torque value is determined based on a smaller value of vertical load information on the left wheel and vertical load information on the right wheel.

4. The method of claim 1,
wherein in the determining of the partial braking threshold torque value, the partial braking threshold torque value is determined by Equation E1:

$$\text{partial braking threshold torque} = \sigma_0 \times \sigma_1 \times \min(\text{vertical load on the left wheel, vertical load on the right wheel}), \quad \text{E1})$$

where $\sigma_0$ refers a coefficient preset in the control unit for converting the load information into the torque value, and $\sigma_1$ refers a parameter value determined by the control unit according to the maximum friction coefficient of a road surface of a road on which the vehicle is traveling.

5. The method of claim 1,
wherein in the determining of the partial braking threshold torque value, the partial braking threshold torque value is determined by Equation E2:

$$\text{partial braking threshold torque} = \sigma_0 \times \min(\text{vertical load on the left wheel, vertical load on the right wheel}), \quad \text{E2})$$

where $\sigma_0$ refers to a coefficient preset in the control unit for converting the load information into the torque value.

6. The method of claim 1,
wherein in the determining of the partial braking threshold torque value, the partial braking threshold torque value is determined by further using real-time roll motion information of the vehicle obtained from the information collected in the vehicle in addition to the obtained real-time vertical load information.

7. The method of claim 6, wherein the roll motion information is at least one of a roll angle and a roll angle change rate.

8. The method of claim 1,
wherein in the determining of the partial braking threshold torque value,
the partial braking threshold torque value is determined by either, as determined, of Equation E3 and Equation E3':

$$\text{partial braking threshold torque} = \sigma_0 \times \sigma_1 \times \min(\text{vertical load on the left wheel, vertical load on the right wheel}) - \sigma_2 \times |\varphi| - \sigma_3 \times \text{sign}(\varphi) \times p, \quad \text{E3})$$

and $$\text{partial braking threshold torque} = \min\{\sigma 0 \times \sigma 1 \times \text{vertical load on the left wheel} - \sigma_2 \times \varphi - \sigma_3 \times p), (\sigma_0 \times \sigma_1 \times \text{vertical load on the right wheel} + \sigma 2 \times \varphi + \sigma 3 \times p)\}, \quad \text{E3'})$$

where $\sigma_0$ refers to a coefficient of a value preset in the control unit for converting the load information into the torque value, $\sigma_1$ refers to a parameter value determined by the control unit corresponding to the maximum friction coefficient of a road surface of a road on which the vehicle is traveling, $\sigma_2$ and $\sigma_3$ refer to coefficients of values preset in the control unit, and $\varphi$ and $p$ refer to a roll angle and a roll angle change rate, which are real-time roll motion information of the vehicle obtained from information collected in the vehicle, respectively.

9. The method of claim 1,
wherein in the determining of the partial braking threshold torque value,
the partial braking threshold torque value is determined by either, as determined, of Equation E4 and Equation E4':

partial braking threshold torque=$\sigma_0 \times \sigma_1 \times$min (vertical load *on* the left wheel, vertical load *on* the right wheel)$-\sigma_2 \times |\varphi|$,      E4)

and partial braking threshold torque=min {$(\sigma_0 \times \sigma_1 \times$vertical load *on* the left wheel$-\sigma_2 \times \varphi)$, $(\sigma_0 \times \sigma_1 \times$vertical load *on* the right wheel$+\sigma_2 \times \varphi)$},      E4');

where $\sigma_0$ refers to a coefficient of a value preset in the control unit for converting the load information into the torque value, $\sigma_1$ refers to a parameter value determined by the control unit corresponding to the maximum friction coefficient of a road surface of a road on which the vehicle is traveling, $\sigma_2$ refers to a coefficient of a value preset in the control unit, and $\varphi$ refers a roll angle, which is real-time roll motion information of the vehicle obtained from the information collected in the vehicle.

10. The method of claim 1,
wherein in the determining of the partial braking threshold torque value,
the partial braking threshold torque value is determined by either, as determined, of Equation E5 and Equation E5':

partial braking threshold torque=$\sigma_0 \times \sigma_1 \times$min (vertical load *on* the left wheel, vertical load *on* the right wheel)$-\sigma_3 \times$sign$(\varphi) \times p$,      E5)

and partial braking threshold torque=min {$(\sigma_0 \times \sigma_1 \times$vertical load *on* the left wheel$-\sigma_3 \times p)$, $(\sigma_0 \times \sigma_1 \times$vertical load *on* the right wheel$+\sigma_3 \times p)$},      E5')

where $\sigma_0$ refers to a coefficient of a value preset in the control unit for converting the load information into the torque value, $\sigma_1$ refers to a parameter value determined by the control unit corresponding to the maximum friction coefficient of a road surface of a road on which the vehicle is traveling, $\sigma_3$ refers to a coefficient of a value preset in the control unit, and $\varphi$ and p refer to a roll angle and a roll angle change rate, which are real-time roll motion information of the vehicle obtained from information collected in the vehicle, respectively.

11. The method of claim 1, wherein in the determining of the partial braking amount, the partial braking amount is determined by Equation E6:

partial braking amount=(basic torque command$-$partial braking threshold torque)$\times$partial braking ratio, further using *a* partial braking ratio of *a* value preset in the control unit.      E6)

12. The method of claim 1, further including:
correcting, by the control unit, the determined basic torque command using the partial braking threshold torque value while the partial braking control is performed; and
controlling, by the control unit, an operation of a driving device configured to drive the vehicle according to a final torque command by setting a torque command after correction as the final torque command.

13. The method of claim 12,
wherein in the correcting of the basic torque command, the torque command after correction is determined by Equation E7:

torque command after correction=(basic torque command$-$partial braking threshold torque$\times$partial braking ratio)/(1$-$partial braking ratio),      E7)

further using a partial braking ratio of a value preset in the control unit.

14. The method of claim 12, further including:
determining, by the control unit, a torque upper limit value from the obtained real-time vertical load information,
wherein in the controlling of the operation of the driving device, the control unit is configured to limit the final torque command not to exceed the torque upper limit value by comparing the torque command after correction with the determined torque upper limit value.

15. The method of claim 14,
wherein in the determining of the torque upper limit value,
the torque upper limit value is determined by Equation E8:

Torque upper limit value=$\sigma_0 \times \sigma_1 \times$max (vertical load *on* the left wheel, vertical load *on* the right wheel)$+\sigma_2 \times |\varphi| + \sigma_3 \times$sign$(\varphi) \times p$, where $\sigma_0$ refers to a coefficient of a value preset in the control unit for converting the load information into the torque value, $\sigma_1$ refers to a parameter value determined by the control unit corresponding to the maximum friction coefficient of a road surface of a road on which the vehicle is traveling, $\sigma_2$ and $\sigma_3$ refer to coefficients of values preset in the control unit, and $\varphi$ and p refer to a roll angle and a roll angle change rate, which are real-time roll motion information of the vehicle obtained from information collected in the vehicle, respectively.

16. The method of claim 1,
wherein in the determining of the partial braking amount,
the partial braking amount is determined by one, as determined, of Equations E9, E10, E11, and E12;

Partial braking amount=$\sigma_4 \times$ {basic average vertical load$-$min (vertical load *on* the left wheel, vertical load *on* the right wheel)}$+\sigma_5 \times |\varphi| + \sigma_6 \times$sign $(\varphi) \times p$;      E9)

Partial braking amount=$\sigma_4 \times$ {basic average vertical load$-$min (vertical load *on* the left wheel, vertical load *on* the right wheel)}$+\sigma_5 \times |\varphi|$;      E10)

Partial braking amount=$\sigma_4 \times$ {basic average vertical load$-$min (vertical load *on* the left wheel, vertical load *on* the right wheel)}$+\sigma_6 \times$sign$(\varphi) \times p$;      E11)

and

Partial braking amount=$\sigma_4 \times$ {basic average vertical load$-$min (vertical load *on* the left wheel, vertical load *on* the right wheel)},      E12)

where the basic average vertical load refers to the average vertical load on the left and right wheels based on a stopped state and a flat ground, $\sigma_4$ refers to a coefficient preset in the control unit for converting the load information into the torque value, $\sigma_5$ and $\sigma_6$ refer to coefficients of values preset in the control unit, and q and p refer to a roll angle and a roll angle change rate, which are real-time roll motion information of the vehicle obtained from the information collected in the vehicle.

17. The method of claim 1,
wherein in the performing of the partial braking control, the turning inner wheel is either ones having a smaller vertical load of the left and right wheels, or either ones having a decreasing vertical load of the left and right wheels.

18. A non-transitory computer readable storage medium on which a program for performing the method of claim 1 is recorded.

19. A method of controlling traveling of a vehicle, the method comprising:
determining, by a control unit, a basic torque command based on vehicle operating information collected in real time during traveling of the vehicle;
obtaining, by the control unit, vertical load information of a left wheel and a right wheel of the vehicle in real time during traveling of the vehicle based on information collected in the vehicle;
determining, by the control unit, a partial braking amount based on the determined real-time basic torque command and the obtained real-time vertical load information; and
performing, by the control unit, a partial braking control controlled by an inner wheel braking device so that a braking force corresponding to the partial braking amount is applied to a turning inner wheel among the left wheel and the right wheel, wherein in the determining of the partial braking amount, the partial braking amount is determined by one, as determined, of Equations E9, E10, E11, and E12;

$$\text{Partial braking amount} = \sigma_4 \times \{\text{basic average vertical load} - \min(\text{vertical load on the left wheel, vertical load on the right wheel})\} + \sigma_5 \times |\varphi| + \sigma_6 \times \text{sign}(\varphi) \times p; \quad \text{E9})$$

$$\text{Partial braking amount} = \sigma_4 \times \{\text{basic average vertical load} - \min(\text{vertical load on the left wheel, vertical load on the right wheel})\} + \sigma_5 \times |\varphi|; \quad \text{E10})$$

$$\text{Partial braking amount} = \sigma_4 \times \{\text{basic average vertical load} - \min(\text{vertical load on the left wheel, vertical load on the right wheel})\} + \sigma_6 \times \text{sign}(\varphi) \times p; \quad \text{E11})$$

and $$\text{Partial braking amount} = \sigma_4 \times \{\text{basic average vertical load} - \min(\text{vertical load on the left wheel, vertical load on the right wheel})\}, \quad \text{E12})$$

where the basic average vertical load refers to an average vertical load on the left and right wheels based on a stopped state and a flat ground, $\sigma_4$ refers to a coefficient preset in the control unit for converting the load information into the torque value, $\sigma_5$ and $\sigma_6$ refer to coefficients of values preset in the control unit, and $\varphi$ and p refer to a roll angle and a roll angle change rate, which are real-time roll motion information of the vehicle obtained from the information collected in the vehicle.

* * * * *